US010919343B2

(12) United States Patent
Bruschelli et al.

(10) Patent No.: US 10,919,343 B2
(45) Date of Patent: Feb. 16, 2021

(54) TYRE FOR MOTORCYLE WHEELS

(71) Applicant: PIRELLI TYRE S.P.A., Milan (IT)

(72) Inventors: Luca Bruschelli, Milan (IT); Mario Mariani, Milan (IT); Giuliano Bonaccorsi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 287 days.

(21) Appl. No.: 15/764,856

(22) PCT Filed: Sep. 29, 2016

(86) PCT No.: PCT/IB2016/055822
§ 371 (c)(1),
(2) Date: Mar. 29, 2018

(87) PCT Pub. No.: WO2017/064585
PCT Pub. Date: Apr. 20, 2017

(65) Prior Publication Data
US 2018/0264886 A1  Sep. 20, 2018

(30) Foreign Application Priority Data
Oct. 12, 2015  (IT) .................. 102015000060629

(51) Int. Cl.
*B60C 11/03*  (2006.01)
(52) U.S. Cl.
CPC ........ *B60C 11/033* (2013.01); *B60C 11/0302* (2013.01); *B60C 11/032* (2013.01);
(Continued)
(58) Field of Classification Search
CPC ....................... B60C 11/033; B60C 11/032
See application file for complete search history.

(56) References Cited

U.S. PATENT DOCUMENTS

2006/0219342 A1* 10/2006 Steinbach ........... B60C 11/0302
152/209.11
2008/0196806 A1  8/2008 Matrascia et al.
(Continued)

FOREIGN PATENT DOCUMENTS

CN  204526666 U  8/2015
JP  S63121505 A  5/1988
(Continued)

OTHER PUBLICATIONS

International Search Report and Written Opinion for International Application No. PCT/IB2016/055822 filed Sep. 29, 2016 on behalf of Pirelli Tyre S.P.A. dated Jan. 13, 2017. 10 pages.
(Continued)

*Primary Examiner* — Robert C Dye
*Assistant Examiner* — Farah Taufiq
(74) *Attorney, Agent, or Firm* — Steinfl + Bruno LLP

(57) ABSTRACT

A motorcycle tyre with a low void-to-rubber ratio while providing a stiffness suitable for good performance on dry ground and on track. A tread band with grooves is arranged to provide a draining effect without structurally weakening the tread band. According to one aspect, the tread band has a tread pattern with two pairs of grooves having segments or portions that produce a warming effect when the compound of the tread band is cold. The tread band provides grip to the ground and limited local warming when the compound of the tread band is at the operating temperature or when driving on dry ground, to provide stiffness and readiness of response.

22 Claims, 8 Drawing Sheets

(52) U.S. Cl.
CPC .......... *B60C 2011/0372* (2013.01); *B60C 2011/0374* (2013.01); *B60C 2200/10* (2013.01)

(56) References Cited

U.S. PATENT DOCUMENTS

| | | | |
|---|---|---|---|
| 2010/0282390 A1* | 11/2010 | Mariani | B60C 11/0311 152/454 |
| 2011/0247738 A1 | 10/2011 | Mariani et al. | |
| 2012/0118456 A1 | 5/2012 | Schiavolin et al. | |
| 2014/0182757 A1* | 7/2014 | Mariani | B60C 11/0302 152/209.8 |
| 2014/0230978 A1* | 8/2014 | Misani | B60C 11/0302 152/209.8 |
| 2018/0272807 A1 | 9/2018 | Misani et al. | |
| 2018/0304694 A1 | 10/2018 | Misani et al. | |

FOREIGN PATENT DOCUMENTS

| | | | |
|---|---|---|---|
| JP | 04321404 A * | 11/1992 | |
| JP | 2004224249 A | 8/2004 | |
| JP | 2011189805 A | 9/2011 | |
| WO | 2010/041283 A1 | 4/2010 | |
| WO | 2010/073279 A1 | 7/2010 | |
| WO | 2011/012980 A1 | 2/2011 | |
| WO | 2011/041859 A1 | 4/2011 | |
| WO | 2011/080566 A1 | 7/2011 | |
| WO | 2013/021271 A1 | 2/2013 | |
| WO | 2015/097582 A1 | 7/2015 | |
| WO | 2017/077418 A1 | 5/2017 | |
| WO | 2017/077419 A1 | 5/2017 | |

OTHER PUBLICATIONS

International Search Report and Written Opinion for International Application No. PCT/IB2016/056407 filed Oct. 25, 2016 on behalf of Pirelli Tyre S.P.A. dated Feb. 3, 2017. 10 pages.
International Search Report and Written Opinion for International Application No. PCT/IB2016/056405 filed Oct. 25, 2016 on behalf of Pirelli Tyre S.P.A. dated Feb. 3, 2017. 10 pages.
Non-Final Office Action for U.S. Appl. No. 15/767,998, filed Apr. 12, 2018 on behalf of Pirelli Tye SPA, dated Apr. 28, 2020. 16 pages.
Non-Final Office Action for U.S. Appl. No. 15/767,617, filed Apr. 11, 2018 on behalf of Pirelli Tyre S.P.A. dated Jun. 12, 2020 16 pages.

* cited by examiner

TYRE FOR MOTORCYLE WHEELS

CROSS-REFERENCE TO RELATED APPLICATIONS

The present application is the U.S. national stage of International Patent Application PCT/IB2016/055822 filed on Sep. 29, 2016 which, in turn, claims priority to Italian application 102015000060629 filed on Oct. 12, 2015.

FIELD OF THE INVENTION

The present invention relates to tyres for motorcycle wheels.

In particular, the present invention relates to high performance tyres for motorcycle wheels, in other words tyres which are able to sustain maximum speeds of at least about 210 km/h or to withstand maximum loads of at least about 210 kg or to withstand a combination of both conditions. Preferably, the present invention refers to tyres intended to be fitted to the rear wheels of motorcycles having large engine capacity (e.g. 600 cm$^3$ or higher), and/or high power (e.g. 100-120 hp or higher), which can be used on both road and track.

PRIOR ART

High performance tyres for two-wheel vehicles, suitable for sporty use, are for example described in the following patent applications to the Applicant WO2010073279, WO2011012980, WO2013021271, WO2015097582.

SUMMARY OF THE INVENTION

In recent times a trend has been observed to introduce in the market motorcycles for supersport use having increasingly higher power. For example, supersport motorcycles having an engine capacity of 1000 cm$^3$, with powers higher than 180-190 hp, homologated for road use, are in fact already available on the market.

The Applicant has noticed an increasing demand for use of such supersport motorcycles, on both road routes and track.

At the same time, the Applicant has noticed an increasing demand for tyres having good performance both for a highly demanding sporty drive (such as, for example, on track) and in terms of lifespan and handling in any weather or season condition (when the motorcycle is used on roads all year round).

The Applicant has noticed that the present needs for typically different and contrasting features sometimes cannot be met even by changing tyres, for example selecting, according to a customary practice, a pair of track tyres and a pair of road tyres.

According to what the Applicant has observed, there is a recent trend among the users to expect from the tyres equipping supersport motorcycles handling features and performance in conditions of high speed and extreme maneuvers on dry and/or hot ground, together with handling and roadholding features on wet or moist ground and/or in cold climate conditions or on not perfect road surfaces.

The Applicant has observed, in fact, that the consumer demands tyres which are safe for road use in any driving condition, also on wet ground, all the year around, and nevertheless maintain high performance, so that they can be used also on track.

Meeting such contrasting needs with a single pair of tyres is a particularly challenging task, wherein typically a different solution is adopted for each of the abovementioned needs, which is suitable for the specific issue, but in contrast with the other needs.

The Applicant has noticed, for example, that for gaining performance on track compounds which are stiffer when the tread band is at operating temperature and a less invasive tread band pattern, i.e. a tread band pattern with a low void-to-rubber ratio, are selected.

On the contrary, the Applicant has observed, for example, that for gaining performance on wet ground a more invasive tread band pattern, i.e. a tread band pattern with a larger number of grooves (high void-to-rubber ratio), and softer compounds are selected. To have compounds with a high stiffness when the tread band is at operating temperature (i.e. warm) typically implies to have compounds which are excessively stiff in cold conditions, for example for a good performance on wet ground.

The Applicant has therefore faced the problem of providing motorcycle tyres which are safe for use on roads all year round in any driving condition, even on wet ground, and are nevertheless performing, so as to allow a use on track as well.

The Applicant focused his efforts for obtaining this improvement by making a tyre having a good performance both on road and track, in different weather and season conditions, thanks to a pattern which, when the compound is cold, allows a localized warming in the tread band portions which are more subjected to stresses when driving straight or at small lean angles, and, on the contrary, does not bring about negative effects, in terms of excessive mobility of the tread band or wear, when the tread band compound is warm.

In a first aspect thereof, the invention relates to a motorcycle tyre, comprising an equatorial plane and a tread band, wherein:
- the tread band comprises a plurality of grooves suitable for defining a tread pattern;
- the grooves of the tread pattern overall define a void-to-rubber ratio equal to or smaller than 15%, preferably equal to or smaller than 10%, on said tread band;
- the tread band comprises a module repeated along a direction of circumferential development of the tyre, comprising:
- at least one first pair of first grooves, oppositely inclined relative to the equatorial plane of the tyre;
- at least one second pair of second grooves, oppositely inclined relative to the equatorial plane of the tyre;
- the first pair of first grooves being arranged so as to circumferentially alternate with the second pair of second grooves;
- the first grooves comprising, moving axially away from the equatorial plane of the tyre at least a first, a second and a third substantially straight and substantially consecutive segments, wherein the first segment has an inclination relative to the equatorial plane adapted to form an angle $\alpha$ equal to or smaller than 35°;
- the second segment has an inclination adapted to form an angle $\alpha'$ equal to or greater than 90°;
- the third segment has an inclination adapted to from an angle $\alpha''$ smaller than 90°, preferably equal to or smaller than 70°;
- the first segment and the second segment extending in a radial region of the tread band defined by radial angles $\varphi$ of between +/−5° and +/−25°,
- the second grooves having an average inclination relative to the equatorial plane adapted to form an angle equal to or smaller than 90°, substantially parallel to the inclination of said third segment of the first grooves;

the second grooves being arranged so that a continuation of their average inclination towards the equatorial plane lies between a first segment of a first groove and the third segment of the first groove which is circumferentially adjacent.

Advantageously, the continuation of the average inclination of the second grooves does not intersect said first and third segments of the first grooves, save close to one of their ends located towards the equatorial plane (i.e. at a point located within the half located towards the equatorial plane of the respective segment).

The Applicant has made a tyre having a low void-to-rubber ratio, which provides a suitable stiffness for a good performance on dry ground and on track, and a tread band with grooves arranged so as to ensure draining without structurally weaken the tread band. The tread pattern is further provided with two pairs of grooves, whose segments or portions are configured and arranged so as to produce a warming effect when the compound of the tread band is cold, typically at the start of a tyre use or in wet conditions, and to provide grip to the ground and limited local warming when the compound of the tread band is at the operating temperature or when driving in dry conditions, so as to provide stiffness and readiness of response.

For the purposes of the present invention, by the expression "module" referred to tread band and particularly to the tread pattern, it is meant a portion of the tread pattern which is repeated the same in succession along the whole circumferential development of the tread band itself. The modules, while keeping the same pattern configuration, may however have different circumferential lengths.

Moreover, for the purposes of the present invention, by "tread pattern" it is meant the representation of each point of the tread band (grooves included) on a plane perpendicular to the equatorial plane of the tyre and tangent to the maximum diameter of the tyre.

By average inclination, in particular referring to the second grooves, it is meant the mean of the inclinations of each of the segments forming the groove weighted with the segment length.

The value of the weighted mean is given by the sum of the products of each value indicating the inclination (e.g. expressed in degrees) by the segment length (e.g. expressed in millimeters), divided by the sum of the lengths of the segments forming the groove.

The continuation having the inclination so calculated can be drawn as the centerline of the smallest tread band portion defined by two directions oriented according to the average inclination, which completely contains the second groove.

By the expression substantially parallel, referred to two groove directions, it is meant that the two directions have inclination angles relative to the equatorial plane which are substantially the same, save for an angular difference of between 0° and about 15°-20° in absolute value.

For the purposes of the present invention, by the expression "substantially straight segments", segments are meant which are arranged according to straight lines over at least 80% of their extension.

Angular measurements, and/or linear quantities (distances, widths, lengths, etc.), and/or areas are to be intended as referred to the tread patter as defined above.

Moreover, referring to the angular arrangement of the grooves and/or recesses formed in the tread band relative to the equatorial plane of the tyre, such an angular arrangement is to be intended, for each point of the groove and/or recess, as referred to the angle (comprised between 0° and 180°) defined by a rotation made starting from the equatorial plane up to the direction tangent to the groove and/or recess passing through that point. Considering a tyre adapted to be fitted to the front wheel of a motorcycle, the rotation is meant to be performed by a vector initially lying along the direction defined in the tread pattern by the equatorial plane, and oriented as the predetermined rotation direction of the tyre. Considering a tyre adapted to be fitted to the rear wheel of a motorcycle, the rotation is meant to be performed by a vector initially lying along the direction defined in the tread pattern by the equatorial plane, and oriented oppositely to the predetermined rotation direction of the tyre.

Moreover, for the purposes of the present invention the following definitions apply:

By "motorcycle tyre" it is meant a tyre having a high curvature ratio (typically greater than 0.20), which allows high camber angles to be reached when the motorcycle runs on a bend.

By "equatorial plane" of the tyre it is meant a plane perpendicular to the rotation axis of the tyre and dividing the tyre into two equal portions.

By "circumferential" direction it is meant a direction generically directed according to the rotation direction of the tyre, or in any case only slightly inclined relative to the rotation direction of the tyre.

By "void-to-rubber ratio" it is meant the ratio between the total area of the grooves of a determined portion of the tread pattern of the tyre (possibly of the whole tread pattern) and the total area of the same portion of the tread pattern (possibly of the whole tread pattern).

By "curvature ratio" of the tyre it is meant the ratio between the distance of the radially highest point of the tread band from the maximum cross section width (also called maximum chord) of the tyre, and the same maximum width of the tyre, in a cross section of the tyre.

By "maximum cross section width" (or maximum chord) it is meant the maximum width of the tyre profile, in other words the length of the segment whose ends are the axially outermost points of the tread band profile.

By "radial angle" of the position of a groove or segment thereof, considering a cross section of the tyre, it is meant the angle between the equatorial plane of the tyre fitted to the wheel of the motorcycle, not contacting the ground, and a radial plane passing through the centerline of the of the groove and the center of a circumference defined by three points: the intersection point between the equatorial plane and the tyre profile and the first two points on the tyre profile which are intersected by the maximum chord.

By the symbol +/−, referred to the radial angle, it is meant to designate the two opposite inclinations which are symmetrical relative to the equatorial plane.

The present invention, in one or more preferred aspects thereof, my comprise one or more of the of the features hereinafter presented.

Preferably, the first segment of the first grooves has an inclination relative to the equatorial plane forming an angle of between 5° and 30°.

Preferably, the second segment has an inclination forming an angle $\alpha'$ of between 100° and 170°.

Conveniently, the second grooves do not have intersection points with the first grooves.

Preferably, the second grooves may extend in a radial region of the tread band defined by radial angles $\varphi$ of between +/−25° and +/−50°.

Preferably, the third segment of the first grooves has an inclination angle relative to the equatorial plane greater than the inclination angle of the first segment of the first grooves.

Preferably, the difference in the inclination angle between the third segment and the first segment of the first grooves may be greater than 10° at least.

Preferably, for preventing the localized warming generated by the second segment of the first grooves from remaining a too much limited phenomenon, and thus from being not relevant for the handling features of the tyre, the module can be repeated along a direction of circumferential development of the tyre at least six times, even more preferably at least seven times, in the case of a tyre intended to be fitted to the rear wheel of a motorcycle, and at least eight times in the case of a tyre intended to be fitted to the front wheel of a motorcycle.

Conveniently, the third segment of the first grooves may have a length greater than or equal to the length of the first segment of the first grooves.

Preferably, the second segment of the first grooves may have a length smaller than the length of the first segment.

Advantageously, the second segment of the first grooves may have a length of between 10% and 50% of the length of the first segment.

Conveniently, the average inclination of the second grooves forms with the equatorial plane an angle smaller than or equal to 70°, preferably of between 20° and 60°.

Advantageously, the axially outermost point of the second segment of the first grooves may be located at radial angles of +/−25° at most.

Preferably, the grooves of the tread pattern overall define on said tread band a void-to-rubber ratio greater than 4%.

Conveniently, in the case of a tyre intended to be fitted to the rear wheel of a motorcycle, the module may comprise at least one pair of third grooves oppositely inclined relative to the equatorial plane of the tyre.

Preferably, the third grooves extend in a radial region of the tread band defined by radial angles of between +/−5° and +/−50°.

BRIEF DESCRIPTION OF THE DRAWINGS

Further features and advantages of the invention shall become clearer from the detailed description of some preferred, although not exclusive, embodiments of a motorcycle tyre according to the present invention.

Such description shall be made hereafter with reference to the accompanying drawings, provided only for indicating, and thus non-limiting, purposes, wherein.

DETAILED DESCRIPTION OF EMBODIMENTS OF THE INVENTION

Figure 1:
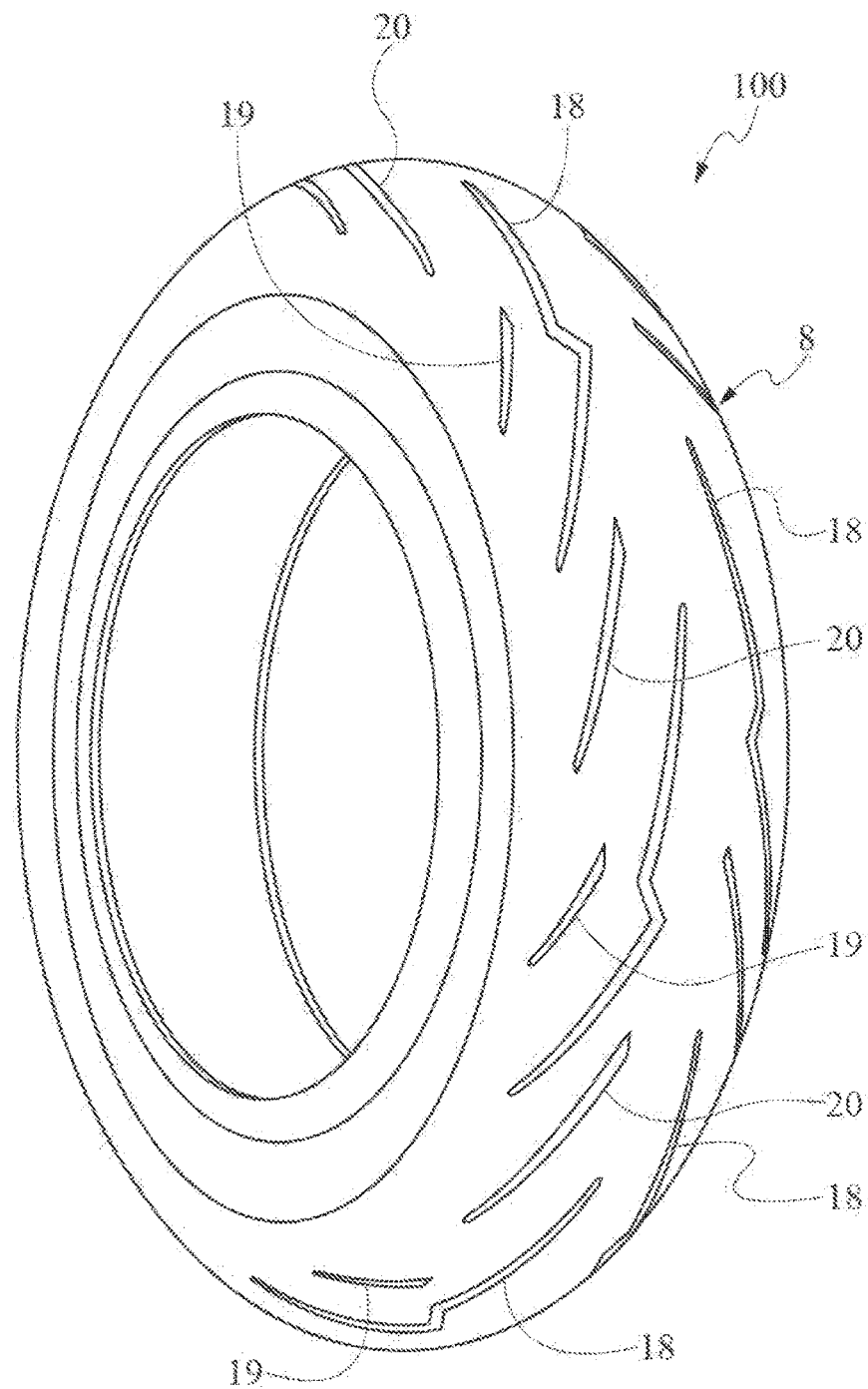
FIG. 1 shows a perspective view of a first example of a first example of a tyre according to the invention, intended to be fitted to the rear wheel of a motorcycle.

In FIGS. 1-3, 3a a tyre for motorcycle wheels according to the present invention is generally indicated at 100. The tyre is preferably intended to be used on a rear wheel of a motorcycle with large engine capacity, e.g. 600 cc.

An equatorial plane X-X and a rotation axis Z (not shown) are defined in the tyre 100. Moreover, there are defined a circumferential direction (indicated in the figures by an arrow F pointing in the rotation direction of the tyre) and an axial direction perpendicular to the equatorial plane X-X.

The tyre 100 comprises a carcass structure 2 including at least one carcass layer 2a, made of an elastomeric material and comprising a plurality of reinforcing elements arranged parallel to one another.

The at least one carcass layer engages, by means of opposite circumferential edges thereof, also superimposed, at least one annular reinforcing structure 9.

In particular, the opposite lateral edges of the at least one carcass layer 2a are turned up about annular reinforcing structures, called bead rings 4.

A tapered elastomeric filling 5 taking up the space defined between the carcass layer 2a and the respective turned-up lateral edge 2b of the carcass layer 2a is applied onto the axially outer perimeter edge of the bead rings 4.

As known, the tyre region comprising the bead ring 4 and the filling 5 forms the so-called bead, intended for anchoring the tyre to a respective fitting rim, not shown.

Figure 2:
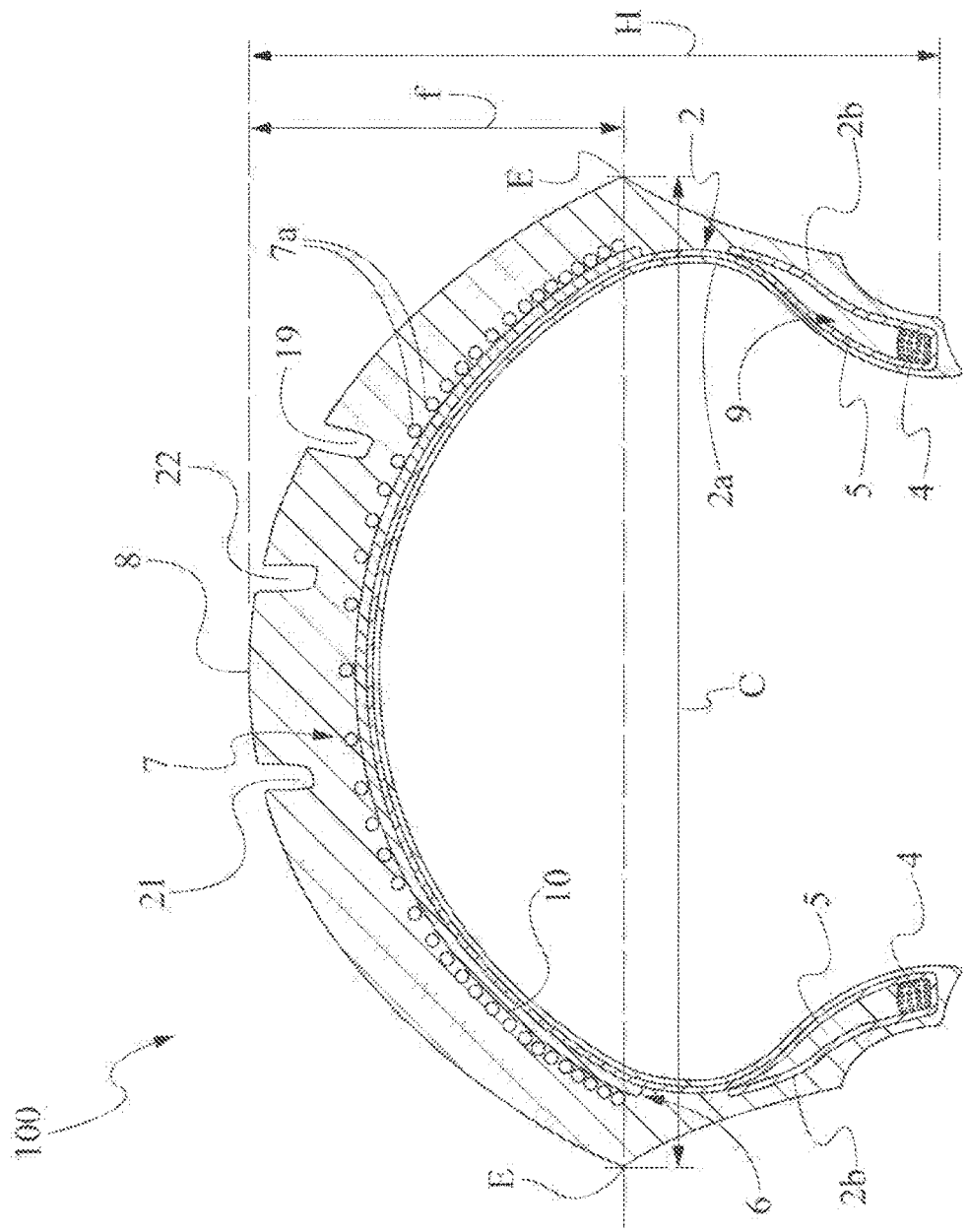
FIG. 2 is a radial section view of the tyre of FIG. 1.

Still referring to the embodiment shown in FIG. 2, the reinforcing elements included in the carcass layer 2a preferably comprise textile cords, selected from those usually adopted in the manufacture of carcasses for tyres, for example Nylon, Rayon, PET, PEN, Lyocell cords, with an elementary filament with a diameter of between 0.35 mm an 1.5 mm, or steel metal cords with an elementary filament with a diameter of between 0.10 mm and 0.5 mm.

In an embodiment not shown, the carcass structure has its opposite lateral edges associated without a turn-up with special annular reinforcing structures provided with two annular inserts. A filling of elastomeric material may be located in an axially outer position relative to the first annular insert. The second annular insert is instead located in an axially outer position relative to the end of the carcass ply. Finally, in an axially outer position relative to said second annular insert, and not necessarily in contact with the same, a further filling may be provided which terminates the formation of the annular reinforcing structure.

A tread band 8 is circumferentially applied, in a radially outer position, on the carcass structure 2. Longitudinal and/or transverse grooves, arranged so as to define a desired tread pattern, are typically formed on the tread band 8 further to a molding operation carried out at the same time with the vulcanization of the tyre.

The tyre 100 may comprise a pair of sidewalls laterally applied on opposite sides to said carcass structure 2.

The tyre 100 has a cross section characterized by a high transverse curvature.

In particular, the tyre 100 has a section height H measured, at the equatorial plane, between the top of the tread band and the fitting diameter, identified by a reference line r, passing through the tyre beads.

The tyre 100 further has a cross section maximum width C defined by the distance between the laterally opposite ends E of the tread profile, and a curvature defined by the specific value of the ratio between the distance f of the top of the tread from the line passing through the ends E of the tread itself, measured at the equatorial plane of the tyre, and the aforesaid maximum width C. The ends E of the tread may be formed by a corner.

In the present description and in the subsequent claims, by high curvature tyres, tyres are meant which have a curvature ratio f/C not smaller than 0.20, preferably f/C≥0.25, for example 0.28. Preferably, such curvature ratio f/C is not greater than 0.8, preferably f/C≤0.5.

Preferably, the tyres have particularly low sidewalls (FIG. 1). In other words, by tyres with low or lowered sidewalls, tyres are meant in which the sidewall height ratio (H-f)/H is smaller than about 0.7, more preferably smaller than about 0.65, for example smaller than or equal to about 0.6.

The carcass structure 2 is typically lined on its inner walls with a sealing layer, or so-called "liner", essentially consisting of a layer of an airtight elastomeric material, adapted to ensure the tight seal of the tyre itself after it has been inflated.

Preferably, the belt structure 6 consists of a layer 7 having a plurality of circumferential windings 7a axially arranged in side-by-side relationship, formed by a rubberized cord or by a strip comprising a number (preferably, from two to five) of rubberized cords, spirally wound at an angle substantially equal to zero (typically between 0° and 5°) relative to the equatorial plane X-X of the tyre. Preferably, the belt structure extends substantially over the whole crown portion of the tyre. In an preferred embodiment, the belt structure 6 may consist of at least two radially superimposed layers, each consisting of elastomeric material reinforced with cords arranged parallel to one another. The layers are arranged so that the cords of the first belt layer are oriented obliquely relative to the equatorial plane of the tyre, whereas the cords of the second layer also have an oblique orientation, but symmetrically crossed relative to the cords of the first layer (so-called "cross-belt").

In both cases, generally, the cords of the belt structure are textile or metallic cords.

Preferably, the tyre 100 may comprise a layer 10 of elastomeric material, located between said carcass structure 2 and said belt structure 6 formed by said circumferential coils, said layer 10 preferably extending over an area substantially corresponding to the area on which the belt structure 6 develops. Alternatively, said layer 10 extends over an area which is smaller than the area on which the belt structure 6 develops, for example only over opposite lateral portions thereof.

In a further embodiment, an additional layer (not shown in FIG. 2) of elastomeric material is located between said belt structure 6 and said tread band 8, said layer preferably extending over an area substantially corresponding to the area on which said belt structure 6 develops. Alternatively, said layer extends only over at least a portion of the development of the belt structure 6, for example over opposite lateral portions thereof.

In a preferred embodiment, at least one of said layer 10 and said additional layer comprises a reinforcing material, for example aromatic polyamide fibers, dispersed in said elastomeric material.

Figure 3:
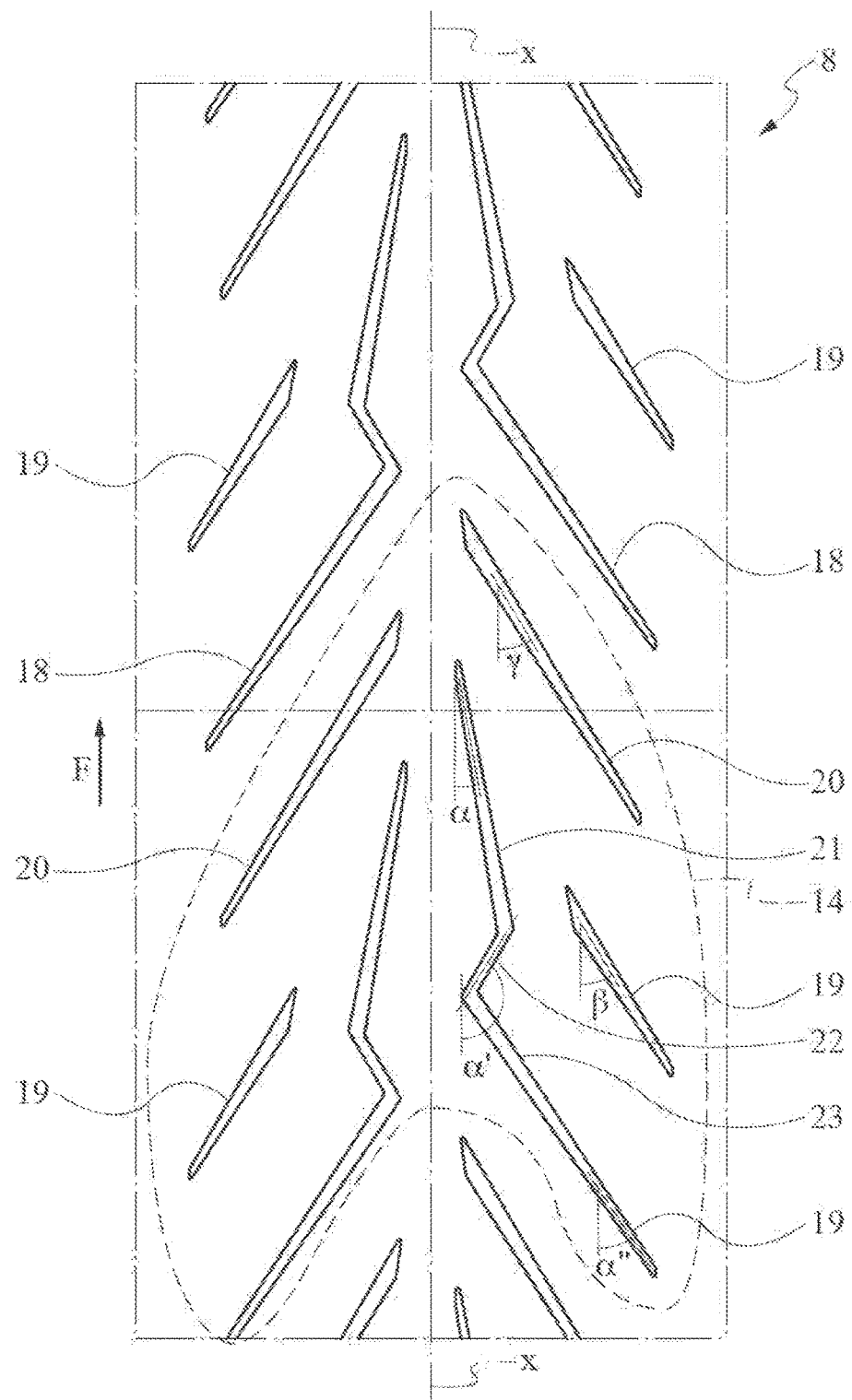
FIG. 3 is a schematic plan view of the tread band of the tyre of FIG. 1.

As better shown in FIG. 3, on the tread band 8 a tread pattern is formed comprising a plurality of grooves, which overall define on the tread band a void-to-rubber ratio greater than 4%.

Preferably, for providing the tread band with a suitable stiffness without limiting its draining ability, the grooves overall define on the tread band a void-to-rubber ratio smaller than 15%, preferably smaller 10%.

The tread pattern comprises a module 14 repeated along a direction of circumferential development of the tyre.

The module 14, in the case of a tyre intended to be fitted to the rear wheel of a motorcycle, such as the one shown in FIG. 3, is repeated at least six times along the circumferential development of the tyre, preferably at least seven times, for example eight times.

Figure 3A:
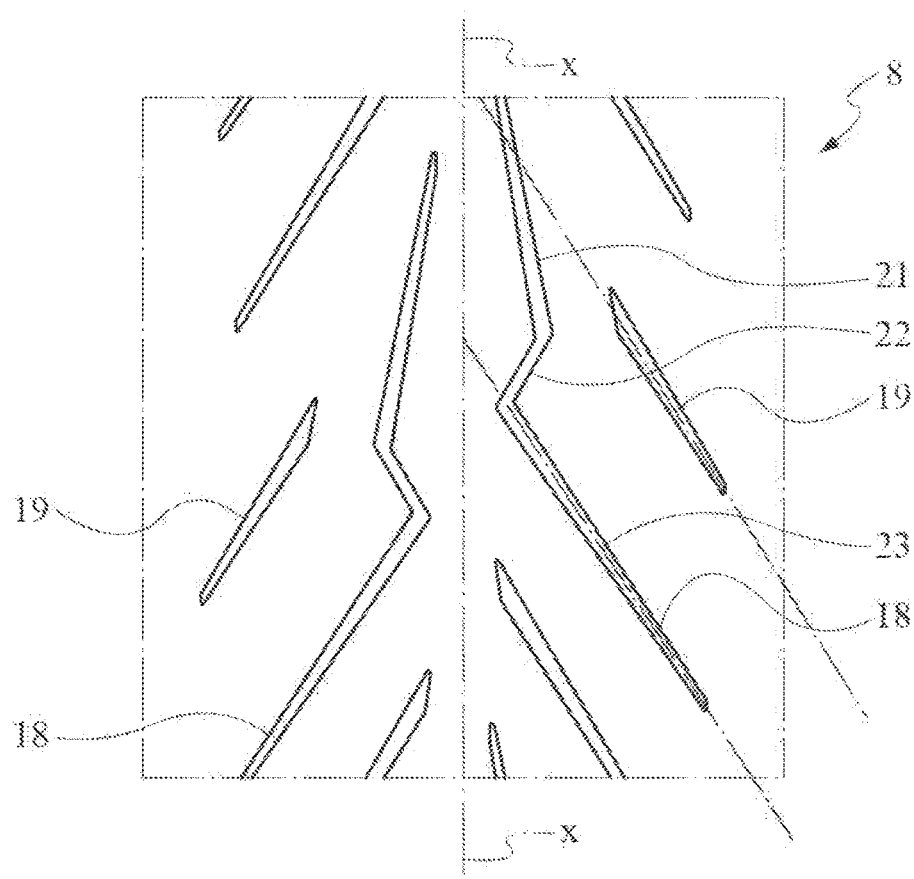
FIG. 3a is a schematic plan view of a portion of the tread band of FIG. 1.

Referring to FIGS. 1, 3, 3a, the module 14 has a pair of first grooves 18 oppositely inclined relative to equatorial plane X-X, a second pair of second grooves 19, also oppositely inclined relative to the equatorial plane X-X of the tyre, and a third pair of third grooves 20, also oppositely inclined relative to the equatorial plane X-X of the tyre.

The first grooves 18 have a considerable extension. In particular, each first groove 18 extends over at least 10% of the circumferential development of the tyre.

Each first groove 18 extends axially away from the equatorial plane X-X.

The second grooves 19 have instead a more limited extension as compared to that of the first grooves 18.

The third grooves 20 also have a considerable extension, but more limited compared to that of the first grooves 18.

In particular, each second groove 19 extends over at most 5% of the circumferential development of the tyre, whereas each third groove 20 extend over at least 5% of the circumferential development of the tyre.

Referring to the embodiment shown in FIGS. 1-3, 3a, it can be seen that the first pair of first grooves 18 is arranged circumferentially alternated with the second pair of second grooves 19 and the third pair of third grooves 20.

Preferably, the first grooves 18 of the first pair are mutually circumferentially staggered and the second grooves 19 of the second pair are mutually circumferentially staggered and circumferentially staggered relative to the first grooves 18 of the first pair.

The third grooves 20 of the third pair are mutually circumferentially staggered and circumferentially staggered relative to the first grooves 18 of the first pair and to the second grooves 19 of the second pair.

Each second groove 19 is arranged between a first groove 18 and a circumferentially adjacent third groove 20 so as not to have intersection points with them.

Referring to the embodiment shown in FIGS. 1 and 3, the first grooves 18, the second grooves 19, and the third grooves 20 are the only grooves of the module 14. In other words, in the module 14 there are no other grooves besides the first grooves 18, the second grooves 19, and the third grooves 20.

Moreover, the tread band 8 does not have other groves besides that forming the module 14.

Referring to the embodiment shown in FIGS. 1, 3, each first groove 18 comprises, moving axially away from the equatorial plane X-X of the tyre, a first 21, a second 22 and a third 23 segment. The three segments 21, 22, 23 are consecutive and straight.

For providing good draining features, preferably the first segment 21 of the first grooves 18 has a length measured along its extension greater than 4% of the circumferential development of the tyre, preferably smaller than 12% of the circumferential development of the tyre.

The substantially straight second segment 22 of the first grooves 18 has instead a limited length, smaller that the length of the first segment 21.

The choice of keeping the extension of the second segment 22 limited, as better explained hereafter, prevents such extension from negatively affecting the handling features of the tyre when running on a dry road, due to an excessive localized warming of the compound.

Preferably, the substantially straight second segment 22 of the first grooves 18 has a length smaller than 3% of the circumferential development of the tyre, more preferably smaller than 2% of the circumferential development of the tyre.

Preferably, the substantially straight second segment 22 has length measured along its extension smaller than 45 mm, even more preferably smaller than 30 mm.

In the embodiment shown in FIG. 3, the substantially straight third segment 23 is arranged consecutively to the second segment 22, without interruption, and has a length greater than or equal to the length of the first segment 21.

The third segment 23 has a length greater than the length of the second segment 22.

Preferably, referring to the embodiment shown in the FIGS. 1, 3, 3a, the second segment 22 has a length of between 10% and 50% of the length of the first segment 21. The third segment 23 has an extension greater than the extension of the second segment 22.

Preferably, the third segment 23 of the first grooves 18 has length greater than 60 mm. Such a choice for the extension of the third segment 23, combined with the arrangement of the same so as to be in communication with the second segment 22, allows the draining features of the tread pattern to be improved.

In the case of the tyre represented in FIGS. 1, 3, the first segment 21 has an inclination relative to the equatorial plane X-X forming an angle α smaller than 35°, preferably smaller than 30°, even more preferably greater than 5°, for example equal to about 15°.

The second segment 22 has instead an inclination relative to the equatorial plane X-X oppositely inclined as compared to that of the first segment 21. In particular, the second segment 22 has an inclination relative to the equatorial plane X-X adapted to form an angle α' greater than 100°, preferably smaller than 170°, for example equal to about 150°.

Even if the direction of the second segment 22 of the first grooves 18 is oppositely inclined as compared to the remaining segments, the Applicant is of the opinion that the configuration and arrangement of such segment, together with the fact that it joins the third segment 23 of the first grooves 18, contribute to warming up the compound in the tread band portion which is more subjected to stresses when driving on wet ground, where excessive lean angles are not reached. The localized warming of the compound acts on the tread band making the same locally softer, which results in a greater grip of the tyre to the ground.

On the contrary, the arrangement and configuration of the third segment 23 of the first grooves 18 allow the compound not to be excessively warmed up when running on dry ground, being outside the tread band portion which is more subjected to stresses in these running conditions, where the driver typically adopts a more sporty driving style and greater lean angles can be reached.

The third segment 23 of the first grooves 18 has an inclination concordant with that of the first segment 21.

The third segment 23 has, in fact, an inclination relative to the equatorial plane X-X adapted to form an angle α" smaller than 90°, preferably smaller than 70°, for example equal to about 40°.

For preventing the localized warming generated by the second segments 22 of the first grooves from remaining a too much limited phenomenon, and thus from being not relevant for the handling features of the tyre, particularly at the start of a tyre use or in wet conditions, the module 14 is repeated along the circumferential development of the tyre many times.

In the case of a tyre intended to be fitted to the rear wheel of a motorcycle, such as that shown in FIG. 3, the module 14 is repeated at least ten times along the circumferential development of the tyre. Preferably, at least eleven times, for example twelve times.

Figure 5A:
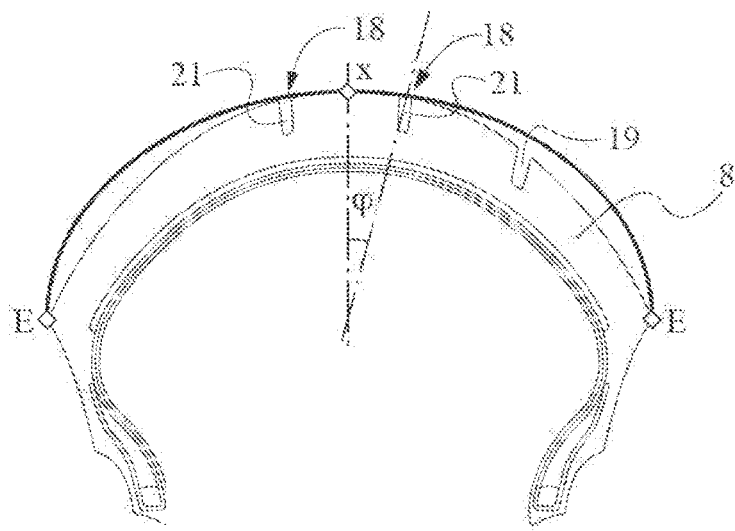
FIGS. 5a-5e show five schematic radial sections of the tyre of FIG. 1, wherein in each section the arrangement of a point of a segment or of a groove is identified by means of its radial angle.
Figure 5B:
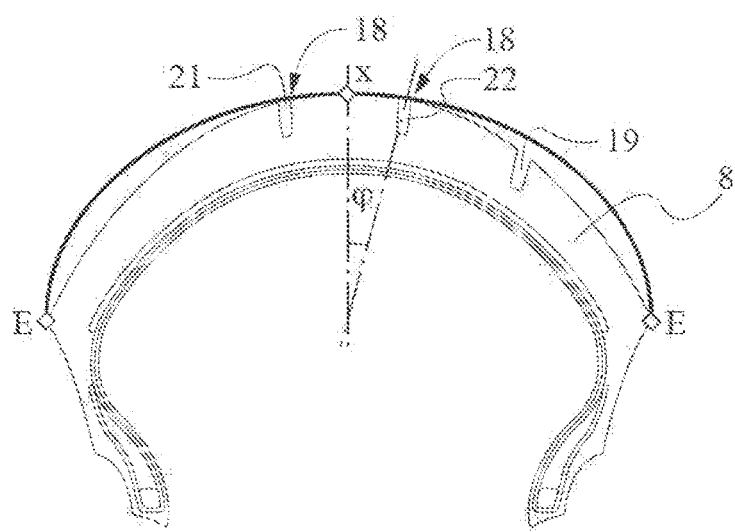
Figure 5C:
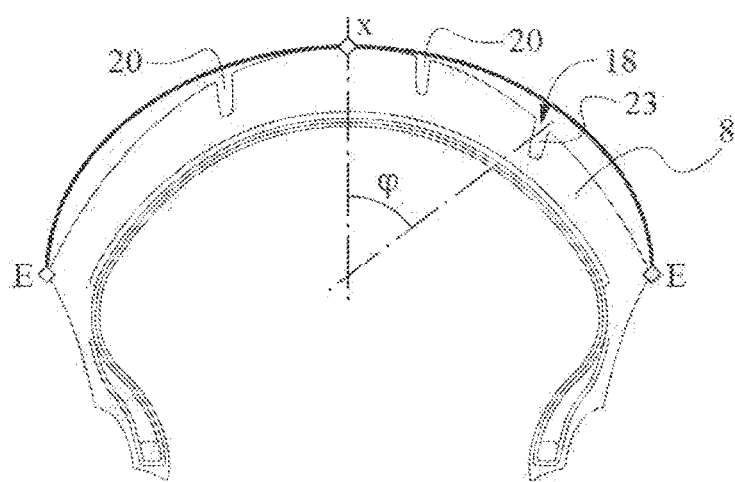

Still referring to the embodiment shown in FIGS. 1, 3, and referring to FIGS. 5a, 5b, the first segment 21 extends in a radial region of the tread band which, in the case of a tyre intended to be fitted to the rear wheel of a motorcycle, is defined by radial angles φ of between +/−5° and +/−25°.

The first segments 21 of the first grooves 18 lying on the right of the equatorial plane X-X extend in a radial region of the tread band defined by radial angles of between +5° and +25°, whereas the first segments 21 of the first grooves 18 lying on the left of the equatorial plane X-X extend in a radial region of the tread band defined by radial angles of between −5° and −25°.

The second segment 22 extends in a radial region of the tread band which, in the case of a tyre intended to be fitted to the rear wheel of a motorcycle, is defined by radial angles φ of between +/−5° and +/−25°.

Also in this case, referring to FIG. 3 and to FIGS. 5a, 5b, thus in the case of tyres intended to be fitted to the rear wheel of a motorcycle, the second segments 22 of the first grooves 18 lying on the right of the equatorial plane X-X extend in a radial region of the tread band defined by radial angles of between +5° and +25°, whereas the second segments 22 of the first grooves 18 lying on the left of the equatorial plane X-X extend in a radial region of the tread band defined by radial angles of between −5° and −25°.

Preferably, the axially outermost point of the centerline of the second segment 22 of the first grooves 18 is thus located at radial angles of +/−25° at most.

The axially outermost point of the centerline of the second segment 22 of the first grooves 18 is located at a distance smaller than 30 mm from the equatorial plane X-X in the case of a tyre intended to be fitted to the rear wheel of a motorcycle.

Finally, the third segment 23 extends in a radial region of the tread band which, in the case of a tyre intended to be fitted to the rear wheel of a motorcycle, is defined by radial angles φ of between +/−5° and +/−50°.

Referring to FIG. 3 and to FIGS. 5a, 5b, thus in the case of tyres intended to be fitted to the rear wheel of a motorcycle, the third segments 23 of the first grooves 18 lying on the right of the equatorial plane X-X extend in a radial region of the tread band defined by radial angles of between +5° and +50°, whereas the third segments 23 of the first grooves 18 lying on the left of the equatorial plane X-X extend in a radial region of the tread band defined by radial angles of between −5° and −50°.

In the embodiment shown in FIGS. 1, 3 the first grooves 18 have a decreasing depth, which gets smaller moving from the equatorial plane X-X towards the shoulders.

Preferably, the first grooves 18 have a depth smaller than or equal to 8 mm. According to an embodiment shown in FIG. 3, the first grooves 18 have a variable width along their extension.

In detail, the first segment 21 has a width which increases moving axially away from the equatorial plane X-X, the second segment 22 has a substantially constant width along its extension, whereas the third segment 23 of the first grooves 18 has a width which decreases moving axially away from the equatorial plane X-X. Preferably, the first grooves 18 have a width smaller than or equal to 6 mm.

Still referring to the embodiment shown in FIG. 3, it can be noted that the second grooves 19 have a limited extension as compared to that of the first grooves 18 or the third grooves 20.

In particular, each second groove 19 has a length measured along its extension smaller than 12% of the circumferential development of the tyre. Preferably, greater than 4% of the circumferential development of the tyre.

Figure 5D:
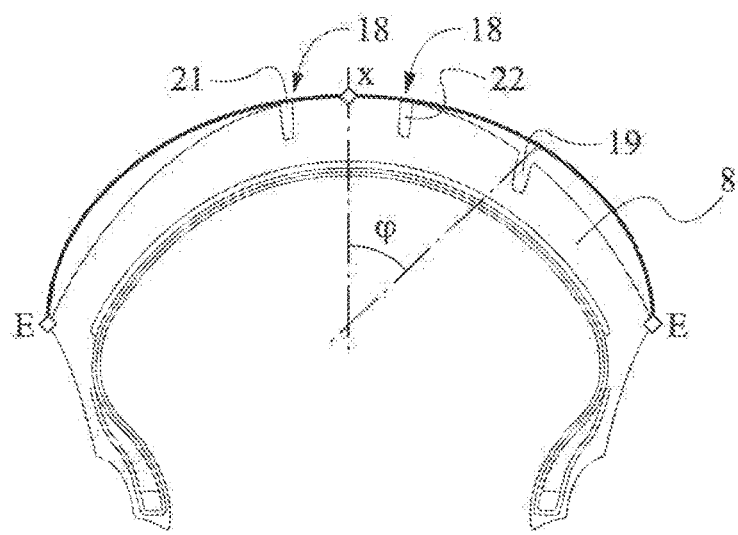
Figure 5E:
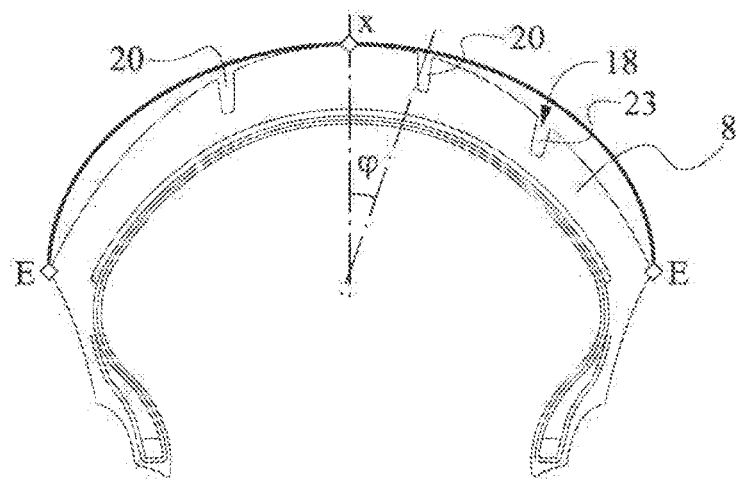

Each second groove 19 extends in a radial region of the tread band which, in the case of a tyre intended to be fitted to the rear wheel of a motorcycle, is defined by radial angles $\varphi$ of between +/−25° and +/−50° (FIG. 5d).

In other words, the second grooves 19 are located in a region of the tread band 8 away from the equatorial plane X-X, corresponding to a tyre portion which is more subjected to stress when leaning, i.e. the tyre portion typically subjected to stresses while driving on dry ground, when the driver generally prefers a more sporty driving style.

The second grooves 19 therefore do not extend in the most central portion of the tread band 8 and typically do not reach the equatorial plane X-X.

As better seen in FIG. 3a, each second groove 19 is arranged so that a continuation of its average inclination towards the equatorial plane X-X lies between a first segment 21 of a first groove 18 and the third segment 23 of the first groove 18 which is circumferentially adjacent.

In detail, still referring to the embodiment shown in FIGS. 3, 3a, each second groove 19 has an average inclination forming an angle $\beta$ smaller than 70°, preferably of between 20° and 60°, for example equal to about 40°.

According to this embodiment, the continuation towards the equatorial plane X-X of the average inclination of each second groove 19 intersects a first groove 18 close to an end thereof which is located towards the equatorial plane X-X.

In particular, the continuation towards the equatorial plane X-X of the average inclination of each second groove 19 intersects the first grooves 18 at the first segment 21 thereof.

The Applicant has observed that such an arrangement and configuration of the second grooves 19, which do not extend in the central portion of the tread band, allows taking advantage of a dual behavior of the tyre.

When the tread compound is cold, typically at the start of a tyre use or in wet conditions, the second grooves 19, by reducing the resistant section all along their axis, create a natural hinge, which, as far as the flexural movements of the sections and the resulting thermal effects are concerned, is equivalent to the behavior of a groove having a greater extension.

The equivalent "virtual" groove with a greater extension, which results in this way, defines a strain direction in the tread band oriented according to the average inclination of the second groove, thus extending its effects up to the most central portion of the tread band located between two first grooves. There it causes a localized warming of the compound due to the sliding of adjacent compound portions along the abovementioned strain direction.

The localized warming acts on the central portion of the band, making the same softer, which results in a better grip of the tyre to the ground, particularly in straight, or almost straight, running conditions.

When the compound of the tread band is at the operating temperature, typically warmed up by tyre use or when driving in dry conditions, the strain component generated by the sliding of adjacent compound portions along the above-mentioned strain direction becomes substantially negligible as compared to the overall strain in the compound at the footprint area.

In other words, when driving in dry conditions with warm compound, the second groove does not extend any more its effect up to the most central portion of the tread band, typically the portion across the equatorial plane, which thus maintains a suitable stiffness adapted to provide stability and readiness of response to the tyre.

In the embodiment shown in FIGS. 1, 3 the second grooves 19 have a decreasing depth, which gets smaller moving from the equatorial plane X-X towards the shoulders.

Preferably, the second grooves 19 have a depth smaller than or equal to 7 mm.

According to the embodiment shown in FIG. 3, the second grooves 19 have a width smaller than 6 mm.

The third grooves 20 have a limited extension as compared to that of the first grooves 18, but greater than that of the second grooves 19.

In particular, each third groove 20 has a length measured along its extension greater than 4% of the circumferential development of the tyre. Preferably, each third groove 20 has a length smaller than 10% of the circumferential development of the tyre.

In detail, the third grooves 20 have a length measured along their extension greater than 70 mm, even more preferably smaller than 100 mm.

Each third groove 20 extends in a radial region of the tread band which, in the case of a tyre intended to be fitted to the rear wheel of a motorcycle, is defined by radial angles $\varphi$ of between +/−5° and +/−50°.

Referring to FIG. 3, thus in the case of tyres intended to be fitted to the rear wheel of a motorcycle, the third grooves 20 lying on the right of the equatorial plane X-X extend in a radial region of the tread band defined by radial angles of between +5° and +50°, whereas the third grooves 20 lying on the left of the equatorial plane X-X extend in a radial region of the tread band defined by radial angles of between −5° and −50°.

Each third groove 20 extends axially away along a straight line inclined relative to the equatorial plane X-X.

In detail, still referring to the embodiment shown in FIGS. 3, 3a, each third groove 20 has an inclination forming an angle y of between 30° and 90°, for example equal to about 40°.

In the embodiment shown in FIGS. 1, 3 the third grooves 20 have a decreasing depth, which gets smaller moving from the equatorial plane X-X towards the shoulders.

Preferably, the third grooves 20 have a depth smaller than or equal to 7 mm.

According to the embodiment shown in FIG. 3, the third grooves 20 have a width of between 7 and 3 mm.

Figure 4:
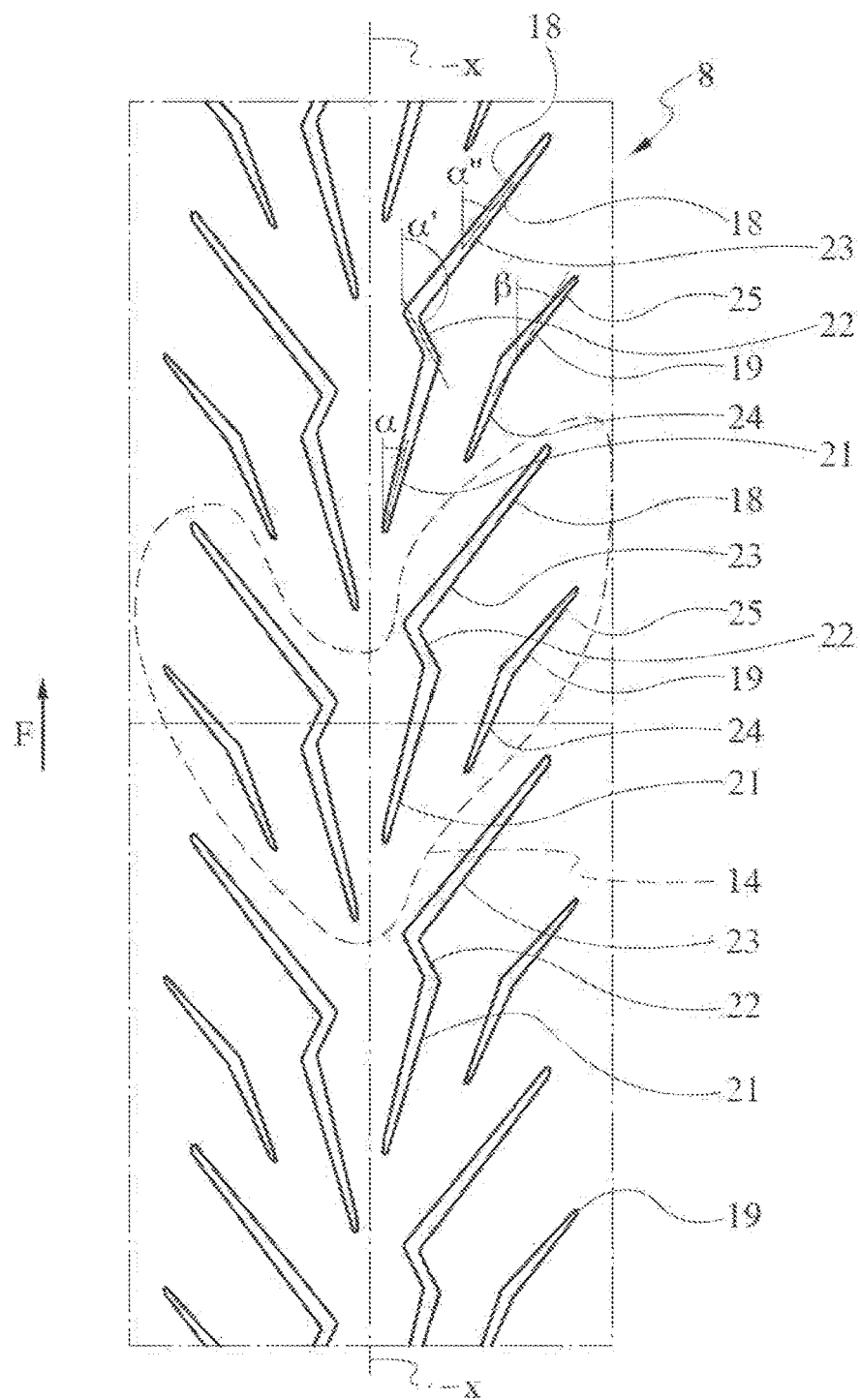
FIG. 4 is a schematic plan view of a second example of the tread band of a tyre according to the present invention, intended to be fitted to the front wheel of a motorcycle.
Figure 4A:
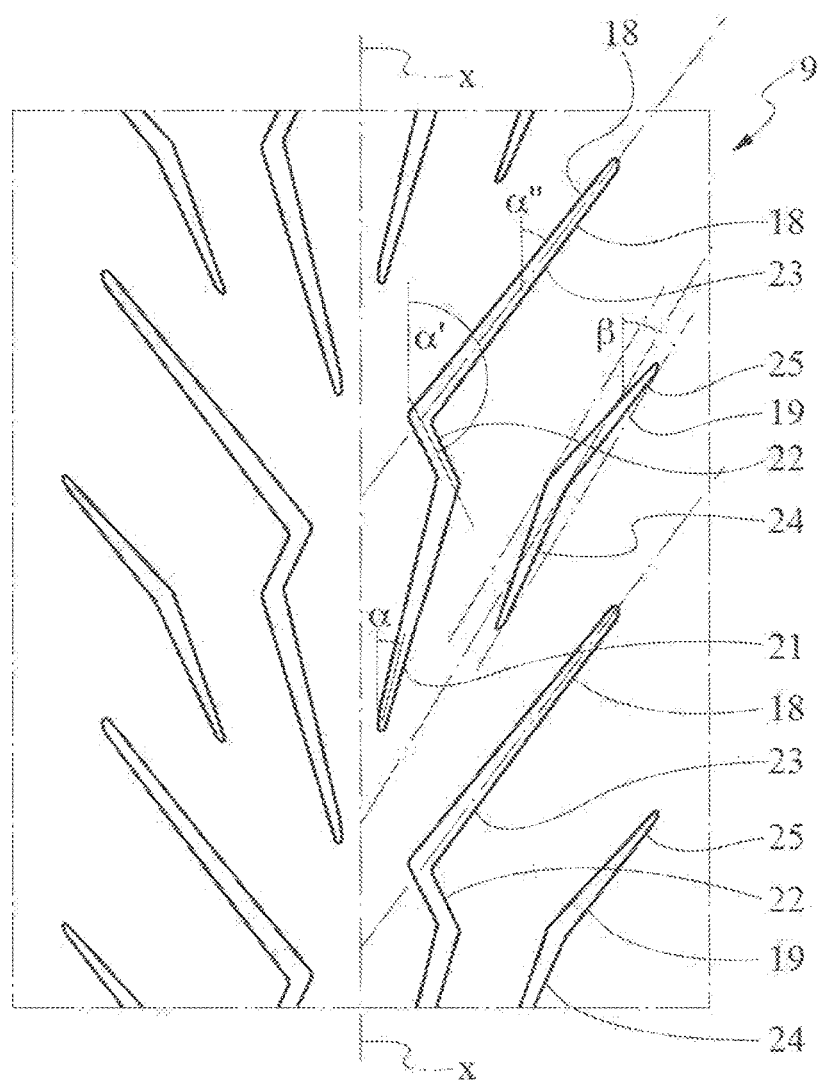
FIG. 4a is a schematic plan view of a portion of the tread band of FIG. 4.

In FIGS. 4 and 4a an embodiment of a tread band of a tyre according to the present invention intended to be fitted to the front wheel of a motorcycle is shown.

The tread pattern is substantially the same as that of the tyre in FIGS. 1-3a, leaving out that the third grooves 20 are not present and the second grooves 19 are formed by two segments 24, 25, arranged consecutively to each other moving axially away from the equatorial plane X-X.

The grooves 18, 19 of the tread pattern also in this case overall define on the tread band a void-to-rubber ratio of between 4% and 10%.

The module 14, in the case of a tyre intended to be fitted to the front wheel of a motorcycle, such as the one shown in FIG. 4, is repeated at least twelve times along the circumferential development of the tyre, preferably at least fifteen times, for example seventeen times.

Referring to FIGS. 4, 4a, the module 14 has a pair of first grooves 18 oppositely inclined relative to equatorial plane X-X and a second pair of second grooves 19, also oppositely inclined relative to the equatorial plane X-X of the tyre.

The first grooves 18 have a considerable extension. In particular, each first groove 18 extends over at least 10% of the circumferential development of the tyre.

The second grooves 19 have instead a more limited extension as compared to that of the first grooves 18.

In particular, each second groove 19 extends over at most 5% of the circumferential development of the tyre.

The first pair of first grooves 18 is arranged circumferentially alternated with the second pair of second grooves 19.

Preferably, the first grooves 18 of the first pair are mutually circumferentially staggered and the second grooves 19 of the second pair are mutually circumferentially staggered and circumferentially staggered relative to the first grooves 18 of the first pair.

Each second groove 19 is arranged between two circumferentially adjacent first grooves 18 so as not to have intersection points with them. In the embodiment shown in FIGS. 4, 4a it can be seen that the first grooves 18 and the second grooves 19 are the only grooves present in the module 14, in other words, in the module 14 there are no other grooves besides the first grooves 18 and the second grooves 19.

Moreover, the tread band 8 does not have other groves besides those forming the module 14.

Each first groove 18 comprises, moving axially away from the equatorial plane X-X of the tyre, three consecutive and straight segments 21, 22, 23.

For providing good draining features, preferably the first segment 21 of the first grooves 18 has a length greater than 4% of the circumferential development of the tyre, preferably smaller than 12% of the circumferential development of the tyre.

Preferably, the substantially straight second segment 22 of the first grooves 18 has a length smaller than 2% of the circumferential development of the tyre, preferably smaller than 1.5% of the circumferential development of the tyre.

Preferably, the substantially straight second segment 22 has length measured along its extension smaller than 40 mm, even more preferably smaller than 30 mm.

In the embodiment shown in FIG. 4, the substantially straight third segment 23 is arranged consecutively to the second segment 22, without any interruption, and has a length greater than or equal to the length of the first segment 21.

The third segment 23 has a length greater than the length of the second segment 22.

Also in the front tyre, the first segment 21 has an inclination relative to the equatorial plane X-X forming an angle α smaller than 30°, preferably greater than 5°, for example equal to about 15°.

The second segment 22 has instead an inclination relative to the equatorial plane X-X oppositely inclined as compared to that of the first segment 21. In particular, the second segment 22 has an inclination relative to the equatorial plane X-X adapted to form an angle α' greater than 100°, preferably smaller than 170°, for example equal to about 150°.

The third segment 23 has, instead, an inclination relative to the equatorial plane adapted to form an angle α" smaller than 90°, preferably smaller than 70°, for example equal to about 40°.

Still referring to the embodiment shown in FIGS. 4, 4a, the first segment 21 extends in a radial region of the tread band which, in the case of a tyre intended to be fitted to the front wheel of a motorcycle, is defined by radial angles φ of between +/−5° and +/−20°.

Referring to FIG. 4, the first segments 21 of the first grooves 18 lying on the right of the equatorial plane X-X extend in a radial region of the tread band defined by radial angles of between +5° and +20°, whereas the first segments 21 of the first grooves 18 lying on the left of the equatorial plane X-X extend in a radial region of the tread band defined by radial angles of between −5° and −20°.

The second segment 22 extends in a radial region of the tread band which, in the case of a tyre intended to be fitted to the front wheel of a motorcycle, is defined by radial angles φ of between +/−5° and +/−20°.

Also in this case, referring to FIG. 4, thus in the case of tyres intended to be fitted to the front wheel of a motorcycle, the second segments 22 of the first longitudinal grooves 18 lying on the right of the equatorial plane X-X extend in a radial region of the tread band defined by radial angles of between +5° and +20°, whereas the second segments 22 of the first grooves 18 lying on the left of the equatorial plane X-X extend in a radial region of the tread band defined by radial angles of between −5° and −20°.

Preferably, the axially outermost point of the centerline of the second segment 22 of the first grooves 18 is thus located at radial angles of +/−20° at most.

The axially outermost point of the centerline of the second segment 22 of the first grooves 18 is located at a distance smaller than 30 mm from the equatorial plane X-X in the case of a tyre intended to be fitted to the front wheel of a motorcycle.

Finally, the third segment 23 extends in a radial region of the tread band which, in the case of a tyre intended to be fitted to the front wheel of a motorcycle, is defined by radial angles φ of between +/−5° and +/−50°.

Referring to FIG. 4, thus in the case of tyres intended to be fitted to the front wheel of a motorcycle, the third segments 23 of the first grooves 18 lying on the right of the equatorial plane X-X extend in a radial region of the tread band defined by radial angles of between +5° and +50°, whereas the third segments 23 of the first grooves 18 lying on the left of the equatorial plane X-X extend in a radial region of the tread band defined by radial angles of between −5° and −50°.

In the embodiment shown in FIGS. 4, 4a the first grooves 18 have a decreasing depth, which gets smaller moving from the equatorial plane X-X towards the shoulders.

Preferably, the first grooves 18 have a depth smaller than or equal to 8 mm. According to an embodiment shown in FIG. 4, the first grooves 18 have a variable width along their extension.

In detail, the first segment 21 has a width which increases moving axially away from the equatorial plane X-X, the second segment 22 has a substantially constant width along its extension, whereas the third segment 23 of the first grooves 18 has a width which decreases moving axially away from the equatorial plane X-X. Preferably, the first grooves 18 have a width smaller than or equal to 6 mm.

Also in the case of the front tyre, the second grooves 19 have a limited extension as compared to that of the first grooves 18.

In particular, each second groove 19 has a length measured along its extension smaller than 4% of the circumferential development of the tyre.

Each second groove 19 extends in a radial region of the tread band which, in the case of a tyre intended to be fitted to the front wheel of a motorcycle, is defined by radial angles φ of between +/−25° and +/−50°.

Thus, the second grooves 19 do not extend in the most central portion of the tread band 8 and, typically, do not reach the equatorial plane X-X.

As better seen in FIG. 4a, each second groove 19 comprises, moving axially away from the equatorial plane X-X of the tyre, two consecutive and straight segments 24, 25.

Referring to the embodiment shown in FIGS. 4, 4a, the segment located at a greater distance from the equatorial plane, i.e. segment 25, is arranged substantially parallel to the third segment 23 of the first grooves 18.

In detail, still referring to the embodiment shown in FIGS. 4, 4a, the segments 24, 25 of the second grooves 19 are arranged so that the second groove 19 has an average inclination forming an angle β smaller than 70°, preferably of between 20° and 60°, for example equal to about 40°.

The second grooves 19 are thus arranged so that a continuation of their average inclination towards the equatorial plane X-X lies between a first segment 21 of a first groove 18 and the third segment 23 of the first groove 18 which is circumferentially adjacent.

According to this embodiment, the continuation of the average inclination of the second groove 19 does not intersect the first grooves 18.

Also for the second groove 19 of the front tyre holds good what has been said in connection with the corresponding groove of the rear wheel. In other words, when the tread compound is cold, typically at the start of a tyre use or in wet conditions, the second grooves 19, by reducing the resistant section all along their axis, create a natural hinge, which, as far as the flexural movements of the sections and the resulting thermal effects are concerned, is equivalent to the behavior of a groove having a greater extension.

The equivalent "virtual" groove with a greater extension, which results in this way, defines a strain direction in the tread band oriented according to the average inclination of the second groove, thus extending its effects up to the most central portion of the tread band located between two first grooves. There it causes a localized warming of the compound due to the sliding of adjacent compound portions along the abovementioned strain direction.

The localized warming acts on the central portion of the tread band, making the same softer, which results in a better grip of the tyre to the ground, particularly in straight, or almost straight, running conditions.

When the compound of the tread band is at the operating temperature, typically warmed up by tyre use or when driving in dry conditions, the strain component generated by the sliding of adjacent compound portions along the abovementioned strain direction becomes substantially negligible as compared to the overall strain in the compound at the footprint area.

In other words, when driving in dry conditions with warm compound, the second groove does not extend any more its effect up to the most central portion of the tread band, typically the portion across the equatorial plane, which thus maintains a suitable stiffness adapted to provide stability and readiness of response to the tyre.

In the embodiment shown in FIGS. 4, 4a the second grooves 19 have a decreasing depth, which gets smaller moving from the equatorial plane X-X towards the shoulders.

Preferably, the first grooves 18 have a depth smaller than or equal to 7 mm.

According to the embodiment shown in FIG. 4, the second grooves 19 have a width smaller than 6 mm. Preferably, the second grooves have a width greater than 1.5 mm.

EXAMPLE

Different samples of the tyre according to an embodiment of the present invention, and particularly having the tread in FIGS. 3 and 4, were made.

A pair of tyres according to the invention (T1), respectively a front tyre and a rear tyre, have been subjected to comparative tests with a pair of comparative tyres (T2) available on the market.

The front tyres, both according to the invention and comparative, had size 120/70 ZR 17 and an inflation pressure of 2.25 bars, whereas the rear tyres had size 190/55 ZR 17 and an inflation pressure of 2.5 bars.

The tests were carried out by equipping a 600 cc motorcycle with the pairs of tyres under comparison.

Figure 6:
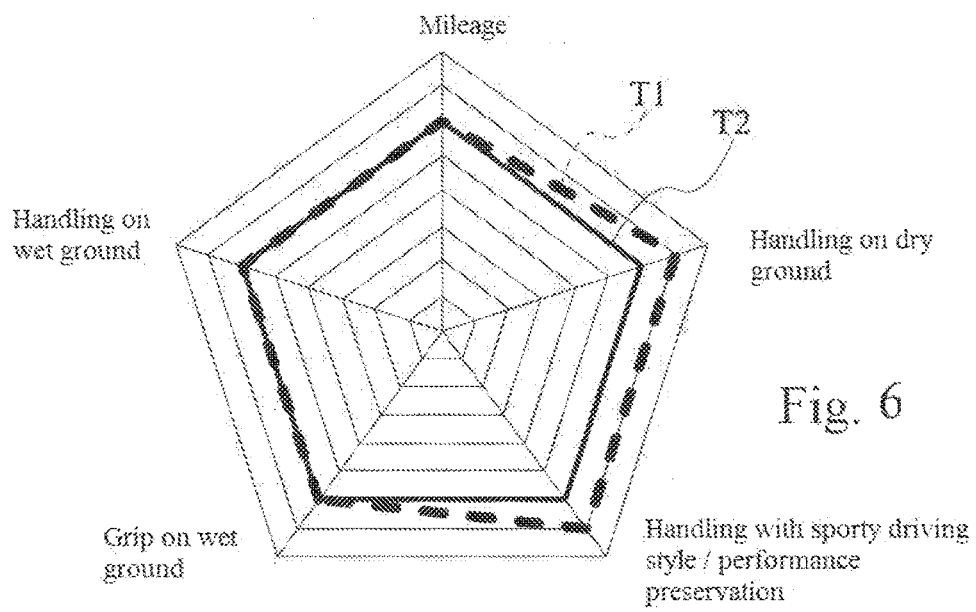
FIG. 6 shows a so-called radar diagram of the performance of a tyre according to the invention as compared to that of tyre according to the prior art.

In FIG. 6 are reported in a radar diagram the mean evaluations obtained with six pairs of tyres according to the invention (T1) as compared to six pairs of comparison tyres (T2) (Sportec M7—Metzler), much appreciated from the users, for the following parameters: mileage, handling on dry ground, handling with sporty driving style (in particular, on track)/performance preservation, grip on wet ground, handling on wet ground.

Such evaluations are expressed as a comparison of the parameters of the set of tyres according to the invention T1 with the same parameters of the set of reference tyres T2.

In particular, the evaluation of the six parameters mentioned above for the set of reference tyres T2 determines the base hexagon, represented by a solid line in FIG. 6, with which the hexagon representing the six parameters for the set of tyres according to the invention T1, represented by a dashed line in FIG. 6, has to be compared.

Each vertex of the hexagons represents one of the parameters evaluated.

In the present case, the superposition of the two hexagons at one vertex means a substantially equal performance, as far as that parameter is concerned, of the set of reference tyres T2 and the set of tyre according to the invention T1. The condition in which the vertex of the hexagon representing the set of tyres according to the invention T2 is located radially more outside than the vertex of the set of reference tyres T2, means instead a better performance, as far as that parameter is concerned, of the set of tyres according to the invention T1. The set of tyres according to the invention T1 has substantially the same behavior as the reference set T2 as far as grip on wet ground, handling on wet ground and mileage are concerned, and a better behavior as compared to the set T2 as far as handling on dry ground, handling with a sporty driving style (in particular, on track)/performance preservation. As it can be seen, keeping other structural features of the tyre the same, the contribution given by the tread pattern is important for providing a good performance when driving on dry ground or on track, without limiting the driving features of the tyre on wet ground or its mileage.

The present invention has been described with reference to some embodiments thereof.

Many modifications can be made in the embodiments described in detail, still remaining within the scope of protection of the invention, defined by the following claims.

The invention claimed is:

1. A motorcycle tyre, comprising: an equatorial plane; and a tread band comprising a plurality of grooves that define a tread pattern with an overall void-to-rubber ratio equal to or less than 15% on said tread band, the plurality of grooves arranged as a repetition of a module along a direction of circumferential development of the tyre, wherein
   i) the module comprises: a first pair of first grooves oppositely inclined relative to the equatorial plane of the tyre, and a second pair of second grooves oppositely inclined relative to the equatorial plane of the tyre,
   ii) the first pair of first grooves circumferentially alternate with the second pair of second grooves,
   iii) each first groove comprises, moving axially away from the equatorial plane, a first, second, and third segment, forming substantially straight and substantially consecutive segments,
   iv) the first segment has an inclination relative to the equatorial plane configured to form a first segment angle equal to or less than 35 °,
   v) the second segment has an inclination relative to the equatorial plane configured to form a second segment angle equal to or greater than 90 °,
   vi) the third segment has an inclination relative to the equatorial plane configured to form a third segment angle less than 90°,
   vii) the first segment and the second segment extend in a radial region of the tread band defined by first radial angles between −5° and −25° or +5° and +25 °,
   viii) each second groove has an average inclination relative to the equatorial plane configured to form a groove angle equal to or less than 90°, said inclination being substantially parallel to the inclination of the third segment,
   ix) each second groove is arranged so that a continuation of a respective average inclination towards the equatorial plane lies between the first segment of one first groove and the third segment of another first groove that is circumferentially adjacent the one first groove, and
   x) each second groove is arranged so that an axial line passing through a first end of said second groove intersects the first segment of one first groove before intersecting the equatorial plane, and an axial line passing through a second end of said second groove intersects the third segment of the first groove before intersecting the equatorial plane.

2. The motorcycle tyre according to claim 1, wherein said continuation intersects said first and third segments only at respective first and third segment ends located towards the equatorial plane.

3. The motorcycle tyre according to claim 1, wherein the second grooves do not have intersection points with the first grooves.

4. The motorcycle tyre according to claim 1, wherein the second grooves extend in a radial region of the tread band defined by second radial angles between −5° and −50° or +5° and +50 °.

5. The motorcycle tyre according to claim 1, wherein the third segment has an inclination angle relative to the equatorial plane greater than the inclination angle of the first segment.

6. The motorcycle tyre according to claim 5, wherein a difference in inclination angle between the third segment and the first segment is greater than 10 °.

7. The motorcycle tyre according to claim 1, wherein the module is repeated along a direction of circumferential development of the tyre:
   at least six times in a case the motorcycle tyre is intended to be fitted to a rear wheel of a motorcycle, and
   at least eight times in a case the motorcycle tyre is intended to be fitted to a front wheel of a motorcycle.

8. The motorcycle tyre according to claim 1, wherein the third segment has a length greater than or equal to a length of the first segment.

9. The motorcycle tyre according to claim 1, wherein the second segment has a length smaller than a length of the first segment.

10. The motorcycle tyre according to claim 1, wherein the second segment has a length of 10% to 50% of a length of the first segment.

11. The motorcycle tyre according to claim 1, wherein the groove angle is less than or equal to 70°.

12. The motorcycle tyre according to claim 1, wherein the groove angle is between 20° and 60°.

13. The motorcycle tyre according to claim 1, wherein an axially outermost point of the second segment is located at radial angles of +/−25° at most.

14. The motorcycle tyre according to claim 1, wherein the overall void-to-rubber ratio is greater than 4%.

15. The motorcycle tyre according to claim 1, wherein the overall void-to-rubber ratio is greater than 4% and smaller than 10%.

16. The motorcycle tyre according to claim 1, wherein the module further comprises a pair of third grooves that are oppositely inclined relative to the equatorial plane.

17. The motorcycle tyre according to claim 1, wherein the third grooves extend in a radial region of the tread band defined by third radial angles between −25° and −50° or +25° and +50 °.

18. The motorcycle tyre according to claim 1, wherein the third segment angle is equal to or less than 70 °.

19. A motorcycle tyre, comprising: an equatorial plane; and a tread band comprising a plurality of grooves that define a tread pattern with an overall void-to-rubber ratio equal to or less than 15% on said tread band, the plurality of grooves arranged as a repetition of a module along a direction of circumferential development of the tyre, wherein
   i) the module comprises: a first pair of first grooves oppositely inclined relative to the equatorial plane of the tyre, and a second pair of second grooves oppositely inclined relative to the equatorial plane of the tyre,
   ii) the first pair of first grooves circumferentially alternate with the second pair of second grooves,
   iii) each first groove consists of, moving axially away from the equatorial plane, a first, second, and third segment, forming substantially straight and substantially consecutive segments so that ends of the second segment respectively join one end of the first segment and one end of the third segment,
   iv) the first segment has an inclination relative to the equatorial plane configured to form a first segment angle equal to or less than 35°,
   v) the second segment has an inclination relative to the equatorial plane configured to form a second segment angle equal to or greater than 90°, vi) the third segment has an inclination relative to the equatorial plane configured to form a third segment angle less than 90°, vii) the first segment and the second segment extend in a radial region of the tread band defined by first radial angles between −5° and −25° or +5° and +25°, viii) each second groove has an average inclination relative to the equatorial plane configured to forma groove angle equal to or less than 90% said inclination being substantially parallel to the inclination of the third segment, and ix) each second groove is arranged so that a continuation of a respective average inclination towards the equatorial plane lies between the first segment of one first groove and the third segment of another first groove that is circumferentially adjacent the one first groove.

20. The motorcycle tyre according to claim 19, wherein the module is repeated along a direction of circumferential development of the tyre:

at least six times in a case the motorcycle tyre is intended to be fitted to a rear wheel of a motorcycle, and at least eight times in a case the motorcycle tyre is intended to be fitted to a front wheel of a motorcycle.

21. A motorcycle tyre, comprising: an equatorial plane; and a tread band comprising a plurality of grooves that define a tread pattern with an overall void-to-rubber ratio equal to or less than 15% on said tread band, the plurality of grooves arranged as a repetition of a module along a direction of circumferential development of the tyre, wherein i) the module comprises: a first pair of first grooves oppositely inclined relative to the equatorial plane of the tyre, and a second pair of second grooves oppositely inclined relative to the equatorial plane of the tyre, ii) the first pair of first grooves circumferentially alternate with the second pair of second grooves, iii) each first groove consists of, moving axially away from the equatorial plane, a first, second, and third segment, forming substantially straight and substantially consecutive segments so that ends of the second segment respectively join one end of the first segment and one end of the third segment, iv) the first segment has an inclination relative to the equatorial plane configured to form a first segment angle equal to or less than 35°, v) the second segment has an inclination relative to the equatorial plane configured to form a second segment angle equal to or greater than 90°, vi) the third segment has an inclination relative to the equatorial plane configured to form a third segment angle less than 90°, vii) the first segment and the second segment extend in a radial region of the tread band defined by first radial angles between −5° and −25° or +5° and +25°, viii) each second groove has an average inclination relative to the equatorial plane configured to form a groove angle equal to or less than 90°, said inclination being substantially parallel to the inclination of the third segment, ix) each second groove is arranged so that a continuation of a respective average inclination towards the equatorial plane lies between the first segment of one first groove and the third segment of another first groove that is circumferentially adjacent the one first groove, and x) each second groove is arranged so that an axial line passing through a first end of said second groove intersects the first segment of one first groove before intersecting the equatorial plane, and an axial line passing through a second end of said second groove intersects the third segment of the first groove before intersecting the equatorial plane.

22. The motorcycle tyre according to claim 21, wherein the module is repeated along a direction of circumferential development of the tyre:

at least six times in a case the motorcycle tyre is intended to be fitted to a rear wheel of a motorcycle, and at least eight times in a case the motorcycle tyre is intended to be fitted to a front wheel of a motorcycle.

* * * * *